US009189181B2

(12) United States Patent
Kouguchi

(10) Patent No.: US 9,189,181 B2
(45) Date of Patent: Nov. 17, 2015

(54) INFORMATION PROCESSING APPARATUS, METHOD, AND COMPUTER PROGRAM PRODUCT COMPARING NUMBER OF COLOR CONVERSIONS CONSIDERING OBJECT ATTRIBUTES

(71) Applicant: KONICA MINOLTA, INC., Chiyoda-ku (JP)

(72) Inventor: Masatsugu Kouguchi, Hachioji (JP)

(73) Assignee: KONICA MINOLTA. INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/547,240

(22) Filed: Nov. 19, 2014

(65) Prior Publication Data

US 2015/0138607 A1 May 21, 2015

(30) Foreign Application Priority Data

Nov. 19, 2013 (JP) ................................. 2013-239288

(51) Int. Cl.
*H04N 1/60* (2006.01)
*G06K 15/02* (2006.01)
*G06F 3/12* (2006.01)
(52) U.S. Cl.
CPC .............. *G06F 3/1211* (2013.01); *G06F 3/122* (2013.01); *G06F 3/1237* (2013.01); *G06K 15/1822* (2013.01); *G06K 15/1878* (2013.01); *H04N 1/60* (2013.01)

(58) Field of Classification Search
None
See application file for complete search history.

(56) References Cited

U.S. PATENT DOCUMENTS

| 6,243,174 | B1 | 6/2001 | Fukasawa | |
|---|---|---|---|---|
| 8,634,107 | B2 * | 1/2014 | Nakamura | ...................... 358/1.9 |
| 8,780,410 | B2 * | 7/2014 | Kouguchi | ...................... 358/518 |
| 9,036,202 | B2 * | 5/2015 | Nishide | .......................... 358/518 |

FOREIGN PATENT DOCUMENTS

JP 10-191088 A 7/1998

* cited by examiner

*Primary Examiner* — Scott A Rogers
(74) *Attorney, Agent, or Firm* — Buchanan Ingersoll & Rooney PC

(57) ABSTRACT

An information processing apparatus calculates a number of times of color conversion performed for an object included in an original document data as a first number of color conversions as the; generates tag bits including attribute information for each pixel of raster data and calculates a number of pixels that are included in the raster data and that have an object attribute indicated by the tag bits as a second number of color conversions; compares, when generating new raster data with color adjustment performed for the original document data, the first number of color conversions with the second number of color conversions; performs color conversion either for the original document data when the first number of color conversions is smaller than the second number, or for the generated new raster data when the second number of color conversions is smaller than the first number.

6 Claims, 11 Drawing Sheets

FIG.10

| Job name | ABCD.doc | |
|---|---|---|
| Resolution | 1200dpi | |
| Number of color conversions | First number of color conversions (Number of color conversions for PDL data) | Second number of color conversions (Number of color conversions for raster data) |
| Page 1 | 7M | 25M |
| Page 2 | 8M | 35M |
| Page 3 | ... | ... |

FIG.12

When resolution = 1200 dpi

| Number of color conversions | First number of color conversions (Number of color conversions for PDL data) | Second number of color conversions (Number of color conversions for raster data) |
|---|---|---|
| Page 1 | 7M | 25M |

When resolution = 600 dpi

| Number of color conversions | First number of color conversions (Number of color conversions for PDL data) | Second number of color conversions (Number of color conversions for raster data) |
|---|---|---|
| Page 1 | 7M | 6.25M |

INFORMATION PROCESSING APPARATUS, METHOD, AND COMPUTER PROGRAM PRODUCT COMPARING NUMBER OF COLOR CONVERSIONS CONSIDERING OBJECT ATTRIBUTES

CROSS-REFERENCE TO RELATED APPLICATION

This application is based on Japanese Patent Application No. 2013-239288 filed on Nov. 19, 2013, the contents of which are incorporated herein by reference.

BACKGROUND

1. Technical Field

The invention relates to an information processing apparatus, an information processing method, and a non-transitory computer readable recording medium stored with an information processing program.

2. Description of Related Art

Current trends in data printing industry and services require more effective printing of data that includes numerous bitmap images such as photobooks. In the raster image processing (RIP, or rasterization processing) for bitmap image data, it is necessary to perform color conversion process for each of the pixels constituting the bitmap image data (raster data). Accordingly, the RIP processing for the bitmap image data takes longer processing time than that of the RIP processing for text data and graphic data. Such extended processing time will be more remarkable in proportion to higher resolution of the bitmap image data and increase in the number of pixels constituting the bitmap image data.

In addition, color adjustment processes typically take place many times in the field of production printing, which means that the RIP processes have to be done frequently every time the color adjustment takes place. Accordingly, prolonged RIP processing time introduces the problem of decrease in the efficiency of the entire printing process.

A known approach to the above-identified problem is to compare the resolutions of the bitmap images before and after the RIP process, perform the color conversion process for the bitmap image having the lower resolution, and thereby reduce the number of times of color conversion process and the processing time (for example, see Japanese Patent Application Laid-Open No. H10-191088).

However, in the context of the production printing, print data may be constructed by layering multiple high-resolution bitmap images to provide various filter effects such as blurs and bumps. When such print data is subjected to color conversion processes, the invention disclosed in the above prior-art reference performs color conversion process for each bitmap image data of the layered bitmap images when the bitmap image resolution prior to the RIP processing is lower than the resolution after the RIP processing. Accordingly, in the case of print data constructed by layering multiple bitmap images, the color conversion process is performed numerous times. Further, when the color conversion process is performed for the data constructed by the multiple bitmap images, a bitmap image residing beneath other layered bitmap images is overwritten with these upper bitmap images without being output, which means that the color conversion processes that took place for the overwritten lower-layer is unnecessary causing waste of computation resources.

As such, when the unnecessary color conversion processes take place many times, the processing time required for the RIP processing is prolonged, undermining the efficiency of the entire printing process. This problem will be more noticeable and serious in proportion to increase in the number of layered bitmap images.

SUMMARY

The present invention is achieved in view of the problems described above. Accordingly, an object of the invention is to provide an information processing apparatus, an information processing method, and a non-transitory computer-readable recording medium stored with the information processing program that are capable of minimizing the number of times of color conversion process, reducing the RIP processing time, and increasing efficiency in the printing process.

To achieve at least one of the above-mentioned objects, the information processing apparatus reflecting one aspect of the present invention includes a first calculation unit configured to calculate a number of times of color conversion performed for an object included in an original document data as a first number of color conversions when raster data is to be generated from the original document data included in a print job with color conversion being performed; a tag bit generation unit configured to generate tag bits including attribute information for each of pixels of the raster data; a second calculation unit configured to calculate a number of pixels that are included in the raster data and an attribute of the pixels indicated by the tag bits being an object attribute as a second number of color conversions; and a color conversion switching unit configured to, when new raster data is to be generated with color adjustment performed for the original document data, compare the first number of color conversions with the second number of color conversions, perform color conversion process for the original document data and then generate the new raster data when the first number of color conversions is smaller than the second number of color conversions, and generate the now raster data from the original document data and then perform color conversion process for the generated new raster data when the second number of color conversions is smaller than the first number of color conversions.

In the context of the above-described information processing apparatus, it is preferable that the first calculation unit calculates, as the first number of color conversions, a number of pixels constituting an image object included in the original document data.

In the context of the above-described information processing apparatus, it is preferable that the second calculation unit calculates, as the second number of color conversions, a number of pixels that are included in the raster data and an attribute of the pixels indicated by the tag bits being an image attribute.

In the context of the above-described information processing apparatus, it is preferable that the second calculation unit corrects the second number of color conversions when an output resolution of the new raster data is different from an output resolution of the raster data.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 10 is a diagram illustrating exemplary management information of the number of color conversions;

FIG. 12 is a diagram illustrating change in the number of second color conversions in response to change in resolution.

DETAILED DESCRIPTION

Figure 1:
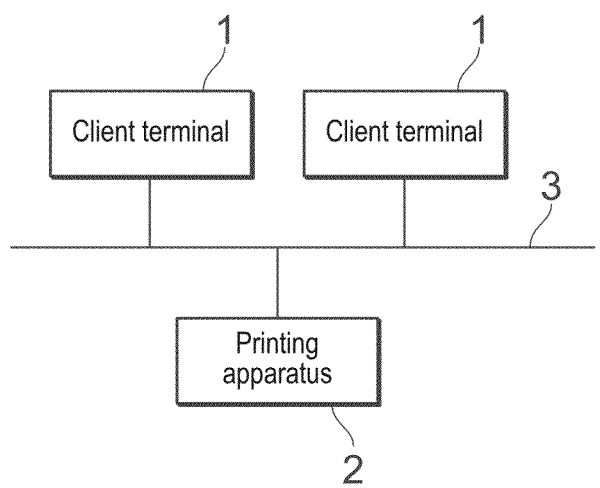
FIG. 1 is a schematic block diagram of a print system according to an embodiment of the invention.

Hereinafter, embodiments of the present invention will be described with reference to the accompanying drawings. In the description of the drawings, the same or like elements are denoted by the same or like reference numerals and redundant descriptions thereof will not be provided. In addition, in some cases, dimensional ratios in the drawings are exaggerated and different from actual ratios for convenience of the description.

FIG. 1 is a schematic block diagram of a print system according to an embodiment of the invention.

As illustrated in FIG. 1, the print system includes a client terminal 1 and a printing apparatus 2 (two exemplary client terminals are illustrated in FIG. 1). The client terminal 1 and the printing apparatus 2 are communicably connected to each other via a network 3.

The client terminal 1 is a portable device such as a client PC (personal computer), a mobile phone, or a personal digital assistance adapted to be operated by a user. The client terminal 1 includes a computer device having a body, a display unit, and an input unit. Details of the configuration of the client terminal 1 will be described later.

The printing apparatus 2 is an image forming apparatus configured to generate an image on the basis of a print job. The print job is transmitted from the client terminal 1 to the printing apparatus 2 via the network 3. The printing apparatus 2 is, for example, a multi-functional peripheral (MFP) having copying, printing, scanning, and other relevant functions. Details of the configuration of the printing apparatus 2 will be described later.

The network 3 is configured as a local area network (LAN) that interconnects computers and network devices in compliance with suitable LAN standards such as Ethernet, Token Ring, and fiber distributed data interface (FDDI). The network 3 may also be configured as a wide area network (WAN) that interconnects multiple LANs via dedicated lines. It should be noted that the types and number of the devices connected to the network 3 are not limited to the exemplary components illustrated in FIG. 1.

Figure 2:
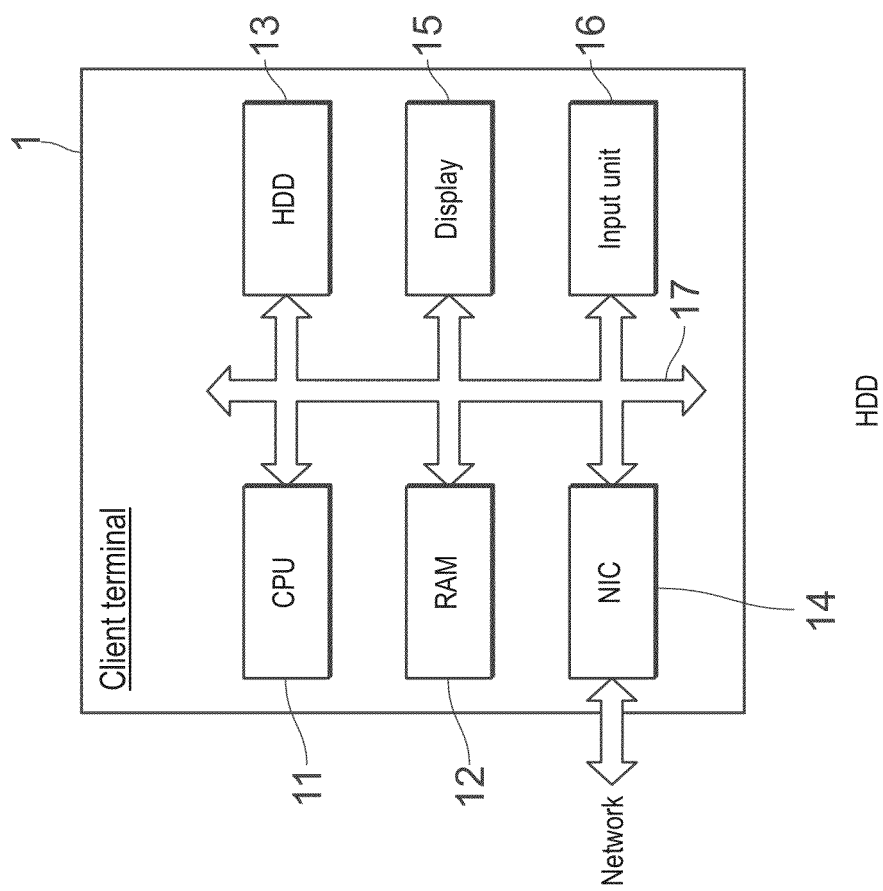
FIG. 2 is a block diagram illustrating a client terminal illustrated in FIG. 1.

FIG. 2 is a block diagram illustrating the client terminal illustrated in FIG. 1.

As illustrated in FIG. 2, the client terminal 1 according to this embodiment includes a central processing unit (CPU) 11, a random access memory (RAM) 12, a hard disk drive (HDD) 13, a network interface card (NIC) 14, a display 15, and an input unit 16. These components are communicably connected to each other via a bus 17.

The CPU 11 is a control circuit that includes a multicore processor adapted to control the above-mentioned components and perform arithmetic processing in accordance with programs stored in the HDD 13.

The RAM 12 is a high-speed random access storage unit that provides working areas and temporarily stores programs and data.

The HDD 13 is a large-capacity random access storage unit adapted to store various programs including a printer driver and an operating system as well as various data. The programs may be stored in a storage unit configured as a semiconductor memory unit such as a solid state drive (SSD) and a CompactFlash (CF).

The NIC 14 is a communication unit including a so-called LAN board. The NIC 14 is a device adapted to provide the client terminal 1 with communications functionality for connection to the network 3.

The display 15 is, for example, a liquid crystal display adapted to display various types of information.

The input unit 16 includes, for example, a pointing device such as a mouse and a keyboard operated to input various types of information.

Various application programs are installed on the client terminal 1. The application programs are, for example, a document creation program for creating documents, a drawing program for creating graphics, an editing program for editing images; and a printer driver adapted to print out original documents that include the created texts, graphics, and/or images.

The printer driver generates document data (i.e., print data) in any format supported by the printing apparatus 2, and transmits the generated document data as the print job to the printing apparatus 2 via the network 3. The description language format includes page description language (PDL) such as PostScript (Registered Trademark) and printer control language (PCL). The print job includes print settings as well as the document data. The document data is associated with the original document including the texts, graphics, and images as discussed above. The print settings are information specified for forming an image of the document data in a given recording medium.

Figure 3:
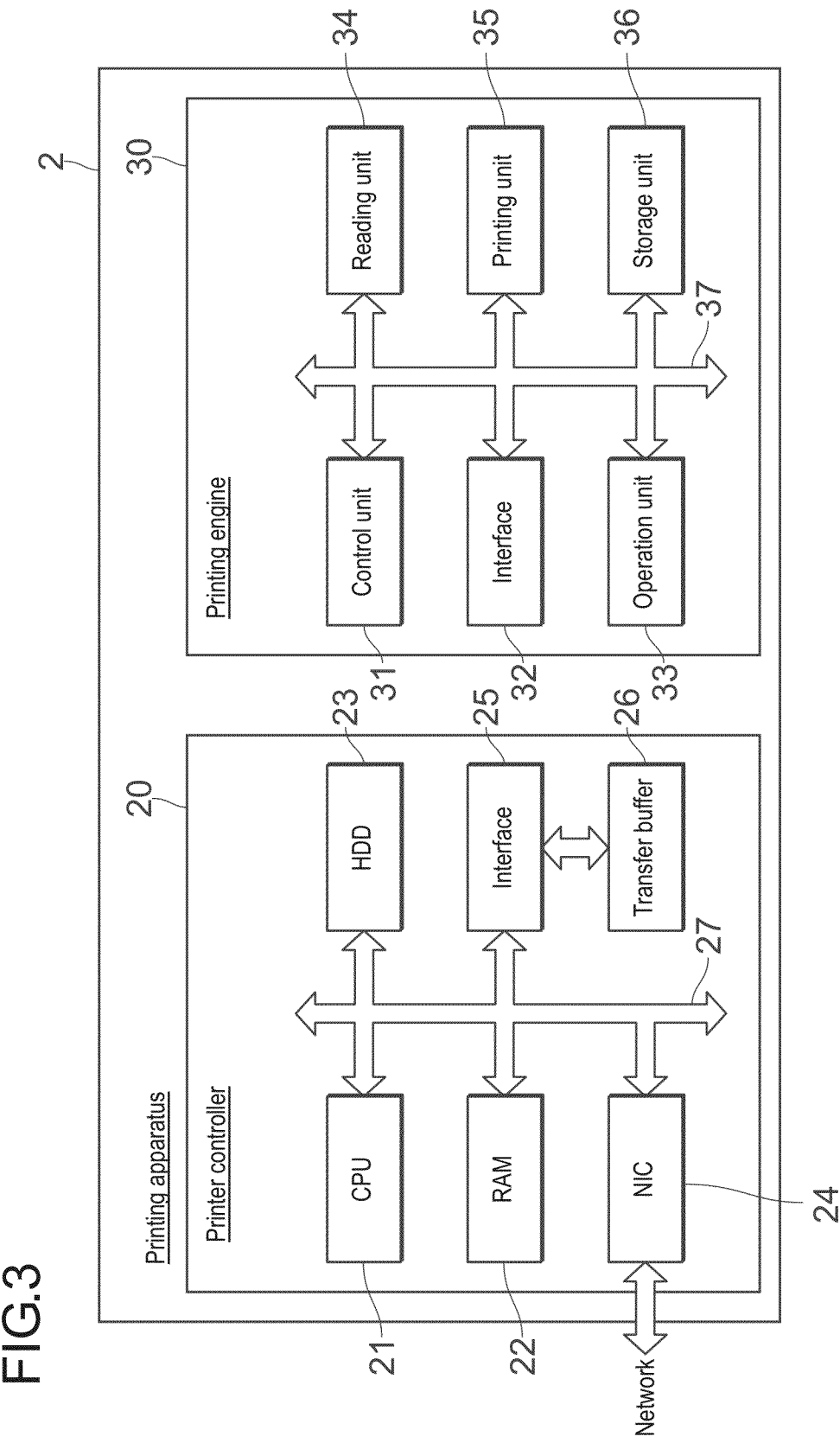
FIG. 3 is a block diagram illustrating a printing apparatus illustrated in FIG. 1.

FIG. 3 is a block diagram illustrating the printing apparatus illustrated in FIG. 1. Since the physical and/or functional configuration of the printing apparatus 2 overlaps partly with that of the client terminal 1, redundant description thereof is not provided.

As illustrated in FIG. 3, the printing apparatus 2 according to this embodiment includes a printer controller 20 and a printing engine 30. The printing apparatus 2 is adapted to receive the print job and perform printing process. As discussed above, the print job is transferred from the client terminal 1 to the printing apparatus 2, and the client terminal 1 is connected via the network 3 to the printing apparatus 2.

The printer controller 20 is an information processing apparatus adapted to convert the document data (i.e., page description language (PDL) data) into raster data (i.e., image data), the document data being transferred from the client terminal 1 to the printer controller 20, and transfer the raster data to the printing engine 30. The printer controller 20 includes a CPU 21, a RAM 22, an HDD 23, an NIC 24, a video interface 25, and a transfer buffer 26. The CPU 21, the RAM 22, the HDD 23, the NIC 24, and the video interface 25 are connected to each other via a bus 27. The transfer buffer 26 is connected to the video interface 25.

The CPU 21 is a control circuit that includes a multicore processor adapted to control the above-mentioned components and perform arithmetic processing in accordance with the programs. The functions of the printer controller 20 are provided through execution of the corresponding programs by the CPU 21.

The RAM 22 is a high-speed random access storage unit that provides working areas and temporarily stores programs and data.

The HDD 23 is a large-capacity random access storage unit adapted to store various programs including an operating system as well as various data. The programs stored in the HDD 23 includes a program for performing raster image processing (RIP or rasterization processing) for the PDL data transferred from the client terminal 1 and generating the raster data. The RIP processing is a typical raster data generation process including interpretation for interpreting the content of the PDL data and rendering for expanding the interpreted data into raster data of a bitmap format. The programs may be stored in a storage unit configured as a semiconductor memory unit such as a solid state drive (SSD) or a CompactFlash (CF). In addition, the print job that has been received from the client terminal 1 and the print job according to which the printing process has been completed are stored in the HDD 23.

The NIC 24 is a communication unit including a so-called LAN board. The NIC 24 is a function extension device adapted to provide the printer controller 20 with communications functionality for connection to the network 3.

The video interface 25 is a dedicated video interface (VIF) for communications with the printing engine 30. The video interface 25 is adapted to transfer the raster data (page data) that has been subjected to the RIP processing to the printing engine 30, the transfer taking place in a sequential manner. In place of the VIF, it is possible to use a serial interface such as Recommended Standard 232 version C (RS-232C), Institute of Electrical and Electronic Engineers 1394 (IEEE 1394), a parallel interface such as IEEE 1284, or any other interfaces configured in accordance with original standards.

The transfer buffer 26 is a dedicated buffer for temporarily storing the raster data when the raster data is to be transferred to the printing engine 30.

The printing engine 30 is used to print out the raster data transferred from the printer controller 20. The printing engine 30 includes, for example, a control unit 31, a video interface 32, an operation unit 33, an original document reading unit 34, a printing unit 35 and a storage unit 36. These units are connected to each other via a bus 37.

The control unit 31 is a control circuit that includes a microprocessor adapted to control the above-mentioned components and perform arithmetic processing in accordance with programs. The functions of the printing engine 30 are provided through execution of the corresponding programs by the control unit 31.

The video interface 32 is a dedicated video interface (VIF) for communications with the printer controller 20. The video interface 32 is connected to the video interface 25.

The operation unit 33 includes a liquid crystal touch panel and a keyboard. The operation unit 33 is adapted to display progress status of the print job and error occurrence status and enable various operations (inputs) to be made. The operation unit 33 serves as both an output unit for presenting the settings to the user and an input unit for obtaining the user's instructions. The keyboard has various keys including numeric keys for specifying the number of copies and any other relevant settings, a start key for instructing start of operation, a stop key for instructing stoppage of operation.

The original document reading unit 34 includes a scanner incorporating a charge coupled device (CCD) image sensor for generating the raster data from an original document image. The original document reading unit 34 further includes an automatic document feeder (ADF). The ADF is used to convey one or more sheets of an original document one by one to a predetermined reading position. The original document reading unit 34 of the printing apparatus 2 may be omitted.

The printing unit 35 includes an engine for forming an image on a sheet of paper as a recording medium using a suitable imaging process such as electrophotography-type process including electrifying, exposing, developing, transferring and fixing steps. The printing unit 35 is used to print out data sent from the printer controller 20 or the original document reading unit 34. In addition, the printing unit 35 includes a paper feeding tray and a manual feed tray for supplying paper.

The storage unit 36 incorporates a dedicated read-only storage unit, a random access storage unit, and a large-capacity storage unit in a suitable manner. The storage unit 36 is, for example, used to store the data sent from the printer controller 20 or the original document reading unit 34. The dedicated read-only storage unit includes a read-only memory (ROM) unit for storing various programs and data. The random access storage unit includes a high-speed RAM providing working areas and temporarily storing the programs and data. The large-capacity storage unit stores various programs including an operating system as well as various data.

In the following, the functions implemented by the programs incorporated in the printer controller 20 and the associated data flow will be described.

Figure 4:
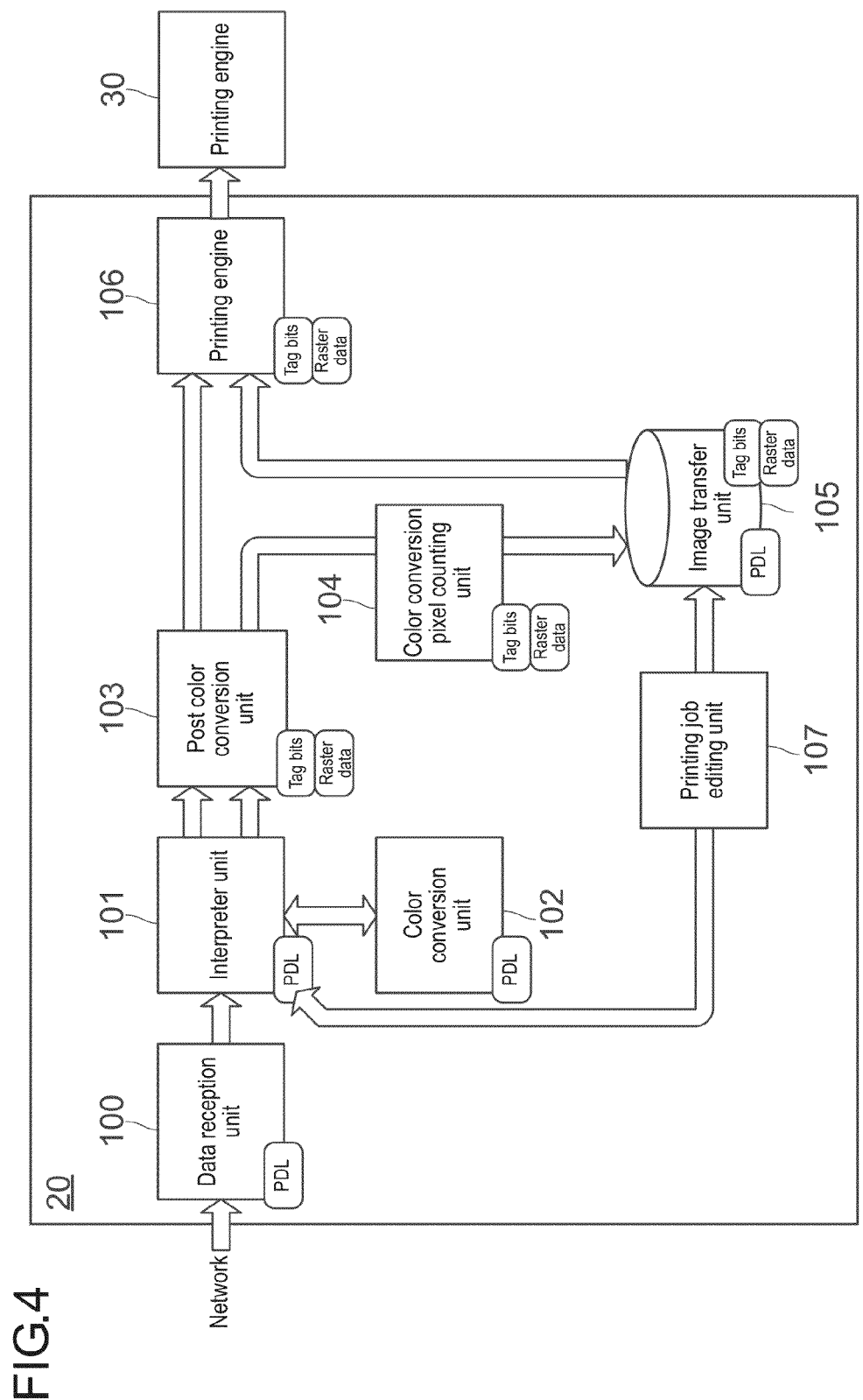
FIG. 4 is a schematic diagram illustrating a functional configuration and data flow in a printer controller illustrated in FIG. 3 and data flow therein.

FIG. 4 is a schematic diagram illustrating a functional configuration and data flow in the printer controller illustrated in FIG. 3.

When the printer controller 20 is started, the printer controller 20 makes the CPU 21 load the programs stored in the HDD 23 on the RAM unit 22 and execute the functions. The functions are implemented, as illustrated in FIG. 4, by a data reception unit 100, an interpreter unit 101, a color conversion unit 102, a post color conversion unit 103, a color conversion pixel counting unit 104, a storage unit 105, an image transfer unit 106, and a print job editing unit 107. The RAM unit 22 or the HDD 23 may serve to provide the hardware configuration of the storage unit 105.

The data reception unit 100 receives the PDL data (document data) from the client terminal 1 via the network 3, the PDL data being included in the print job. The interpreter unit 101 is a raster image processor (RIP). The interpreter unit 101 generates raster data of a bitmap format from the PDL data that has been received by the data reception unit 100. The raster data generated by the interpreter unit 101 is raster data having color values converted by the color conversion unit 102 or raster data having, on an as is basis, the color values of the PDL data received by the data reception unit 100. The raster data is, for example, a CMYK-toner-version raster data specifying an output range of four toner colors of cyan, magenta, yellow, and black (CMYK) (hereafter simply referred to as CMYK toner). The interpreter unit 101 as a tag bit generation unit generates tag bits that associate each of the pixels of the CMYK toner-version raster data with attribute information of the represented object on a per pixel basis. The tag bits will be described later in detail.

The color conversion unit 102 operates in cooperation with the interpreter unit 101 and performs color conversion process for determining a color value of the raster data for printing. The color conversion unit 102 receives the color values of an object included in the PDL data from the interpreter unit 101, uses a color conversion table such as an ICC profile, and performs the color conversion for the colors of the PDL data into colors in a color space of the printing apparatus 2. The color conversion unit 102 converts, for example, an object represented by RGB color values into an object represented by CMYK color values. The color conversion unit 102 as a first calculation unit calculates the number of times of first color conversion process applied to the object included in the PDL data as a first number of color conversions. The color conversion unit 102 transfers the PDL data that has been subjected to the color conversion process to the interpreter unit 101. In addition, the color conversion unit 102 stores the obtained first number of color conversions in the storage unit 105.

The post color conversion unit 103 receives the raster data and the tag bits from the interpreter unit 101. When the received raster data was generated on the basis of the PDL data that is not subjected to the color conversion process by the color conversion unit 102, then the post color conversion unit 103 performs color conversion process for the received raster data. On the other hand, when the received raster data was generated on the basis of the PDL data that has been subjected to the color conversion process by the color conversion unit 102, then the post color conversion unit 103 does not perform the color conversion process for the received data and transfers the received data on an as is basis to the color conversion pixel counting unit 104 and the image transfer unit 106.

The color conversion pixel counting unit 104 as a second calculation unit calculates the number of pixels that are included in the raster data and are to be subjected to the color conversion process as a second number of color conversions. The calculation is performed on the basis of the raster data and the tag bits that have been received from the post color conversion unit 103. The color conversion pixel counting unit 104 transfers the raster data and the tag bits to the storage unit 105. In addition, the color conversion pixel counting unit 104 stores the obtained second number of color conversions in the storage unit 105.

The storage unit 105 stores the raster data and the tag bits received from the color conversion pixel counting unit 104. In addition, the storage unit 105 stores the PDL data that has been received by the data reception unit 100. Further, the storage unit 105 stores the first number of color conversions and the second number of color conversions, the first number of color conversions being calculated by the color conversion unit 102 and the second number of color conversions being calculated by the color conversion pixel counting unit 104.

The image transfer unit 106 receives the raster data and the tag bits from the post color conversion unit 103 or the storage unit 105, and transfers the received raster data and the tag bits to the printing engine 30.

The print job editing unit 107 edits the PDL data in the storage unit 105, the editing PDL data taking place by remote control from the external client terminal 1. Alternatively, the print job editing unit 107 may edit the PDL data in accordance with the operation of the operation unit 33 made by the user. Editing PDL data means editing the print settings and includes, for example, changing print quality, changing print layout, and making color adjustment such as changing a tone curve and a color profile.

In addition, the print job editing unit 107 as a color conversion switching unit compares the first number of color conversions of the PDL data with the second number of color conversions of the PDL data and switches the target of the color conversion process and the mode of the color conversion process when the PDL data which has already edited in accordance with the instruction from the client terminal 1 or any other instructions is again to be printed.

The printing engine 30 performs printing process on the basis of the raster data that is transferred by the image transfer unit 106.

(Tag Bits)

Figure 5:
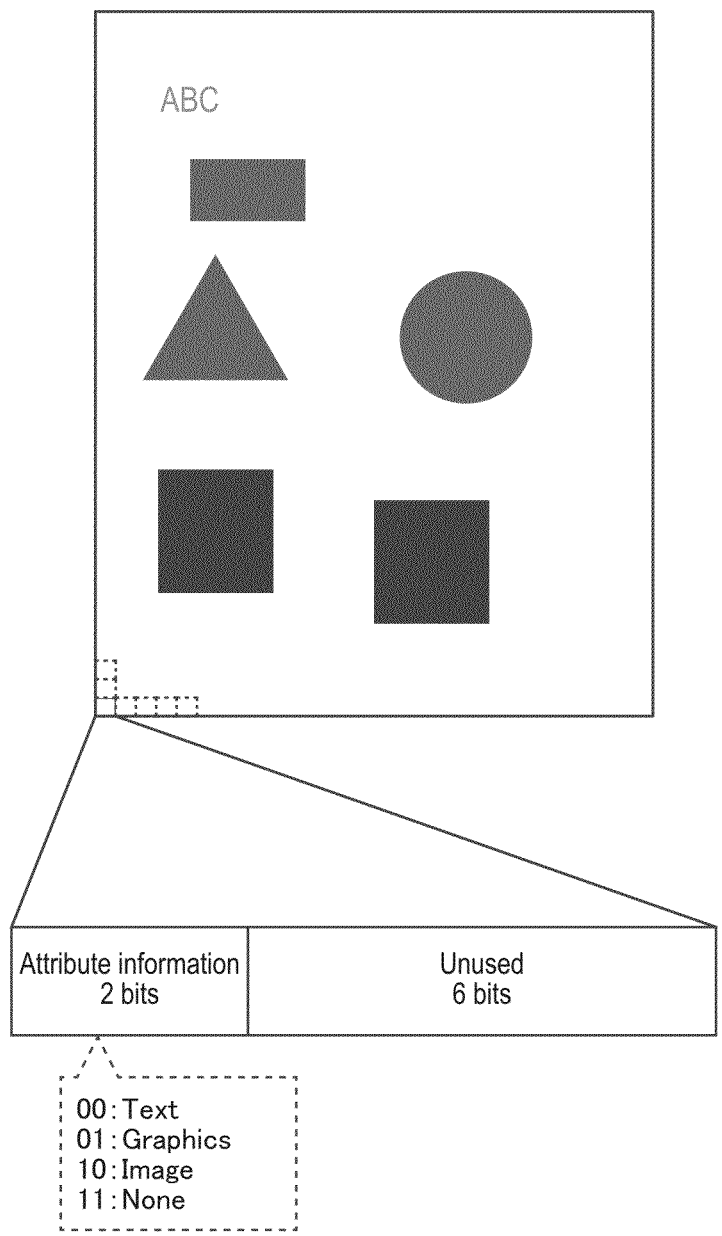
FIG. 5 is a conceptual diagram illustrating tag bits.
Figure 6:
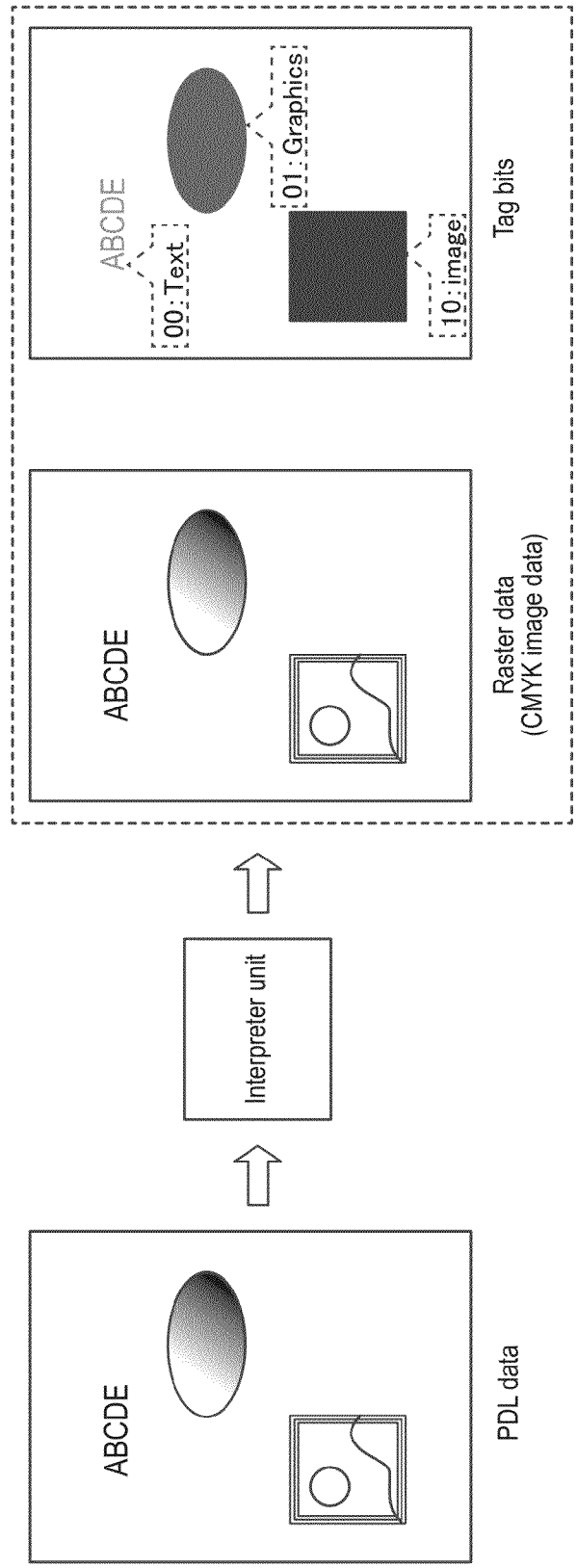
FIG. 6 is a diagram illustrating how the raster data and tag bits are generated from PDL data.

FIG. 5 is a conceptual diagram illustrating the tag bits. FIG. 6 is a diagram illustrating how the raster data and the tag bits are generated from the PDL data.

Each of the pixels of the raster data is associated with the color values of CMYK toner in a pixel-wise manner (i.e., on a per pixel basis). Meanwhile, as illustrated in FIG. 5, as the tag bits, one byte (eight bits) of information is associated with each of the pixels of the raster data. In particular, in the context of this embodiment, the attribute information of each of the pixels is associated with the tag bits. The attribute information indicates the types of object that is represented by the pixels, and the types include, for example, "Text", "Graphic", "Image", and "None" (no object). The attribute of "Text", "Graphic" and "Image", except for "None", is treated as an object attribute.

In the conceptual diagram of a page illustrated in FIG. 5, the pixels constituting the rectangles in the lower portion of the page are each associated with an image attribute, i.e., the attribute information that indicates that the type of the object formed by this pixel is an image. Likewise, in FIG. 5, the pixels constituting a triangle, a circle, and a rectangle in the central or upper portion of the page are each associated with a graphic attribute, i.e., the attribute information that indicates that the type of the object formed by this pixel is a graphic. Further, in FIG. 5, the pixels constituting the "ABC" in the uppermost portion of the page are each associated with a text attribute, i.e., the attribute information that indicates that the object formed by this pixel is a text. The remaining pixels residing in the range that is not occupied by these objects are each associated with a no object attribute, i.e., the attribute information that indicates that no object is formed by this pixel. The values of the unused bits in the string of the tag bits may be associated with various types of information such as color space information indicative of the color space in which each pixel is to be represented or information indicating the presence of overprint.

As illustrated in FIG. 6, when the PDL data is input to the interpreter unit 101, the interpreter unit 101 generates the raster data and the tag bits on the basis of the PDL data. The raster data is data in which each of the pixels is associated with corresponding color values of the CMYK toner and used to represent an image, a graphic, and a text in accordance with an image object, a graphic object, and a text object that are included in the PDL data. The tag bits are used to associate each of the pixels of the raster data with the attribute information (Image, Graphic, Text, or None) of a represented object.

(Operation Overview of the Print System)

In the following, an exemplary operation of the print system according to this embodiment will be described.

When a print job undergoes the printing process for the first time, the printer controller 20, makes the color conversion unit 102 count the number of times of color conversion process applied to a target PDL data as the first number of color conversions. In addition, the printer controller 20 makes the color conversion pixel counting unit 104 count the number of pixels that are included in the raster data generated from the PDL data and that are to be subjected to the color conversion process as the second number of color conversions. The first number of color conversions and the second number of color conversions are associated with the print job and stored in the storage unit 105.

When the above-described print job has been subjected to the printing process and the same print job is to be printed again after being subjected to a color adjustment process or any other processes, then the printer controller 20 compares the first number of color conversions stored in the storage unit 105 with the second number of color conversions stored in the storage unit 105. On the basis of the result of comparison, the printer controller 20 switches between the color conversion process for the PDL data by the color conversion unit 102 and the color conversion process for the raster data by the post color conversion unit 103.

In the following, the details of the above-described processes will be described.

(Counting Process of the First Number of Color Conversions)

Figure 7:
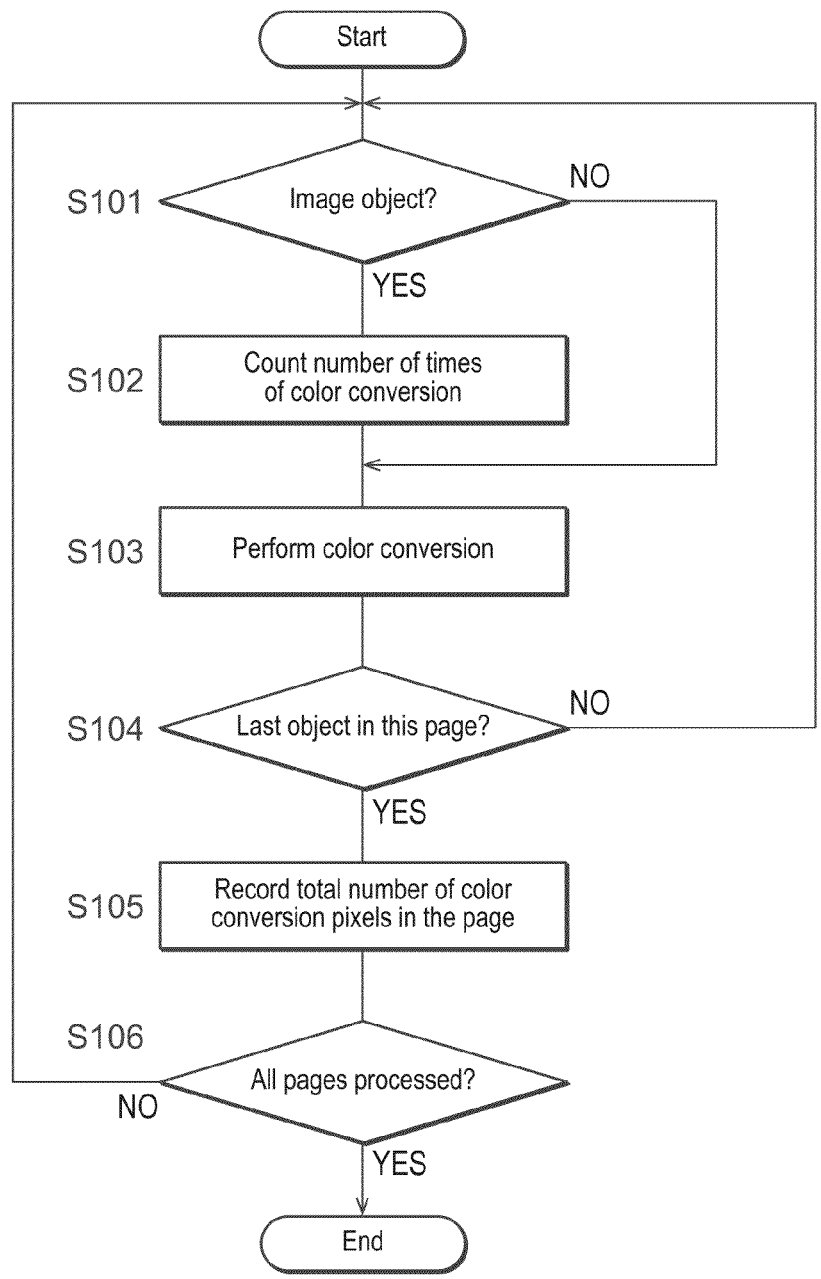
FIG. 7 is a flowchart illustrating a procedure for counting process of a first number of color conversions by a printer controller.

FIG. 7 is a flowchart illustrating a procedure for counting process of the first number of color conversions by the printer controller.

As illustrated in FIG. 7, the printer controller 20 determines, for each of the objects included in each page of the PDL data, whether or not the objects are an image object (Step S101).

When it is determined that the object is an image object (Yes in Step S101), the printer controller 20 counts the number of times of color conversion process to be performed for that object (Step S102). For example, when the object is an image object which represents a photograph, the colors of the pixels constituting the image object in most cases differ from each other. As a result, since the color conversion processes have to be performed for each of the pixels constituting the image object, the number of times of color conversion process to be performed will be identical with the number of pixels of the image object. Accordingly, the printer controller 20 counts the number of pixels of the image object, and stores the obtained number of pixels in the storage unit 105 as the number of color conversions for each of the object. A method of counting the numbers of color conversions for each of the objects will be described later.

Meanwhile, when it is determined that the object is not an image object (No in Step S101), the printer controller 20 proceeds to the process of the step S103.

Then, the printer controller 20 performs the color conversion process for this object (Step S103).

Further, the printer controller 20 determines whether or not this object is the last objects found in the page (Step S104).

When it is determined that this object is not the last object (No in Step S104), the printer controller 20 goes back to the process of the step S101, and performs the processes of the step S101 to the step S103 for the next object in that page.

When it is determined that this object is the last object (Yes in Step S104), the printer controller 20 sums up the numbers of color conversions of the image objects stored in the storage unit 105 in the step S102, and calculates a total number of color conversion pixels (number of pixels requiring color conversion) within the page (Step S105). The printer controller 20 stores the total number of color conversion pixels within the page calculated in the step S105 in the storage unit 105 as the first number of color conversions for this page.

Then, the printer controller 20 determines whether or not the processes have been completed for all of the pages (Step S106).

When the processes have not yet been completed for all the pages (No in Step S106), the printer controller 20 goes back to the step S101 and performs the processes for the next page.

When the processes have been completed for all of the pages (Yes in Step S106), the printer controller 20 terminates the processes.

(Counting Method of the Number of Color Conversions for Each Object)

Figure 8:
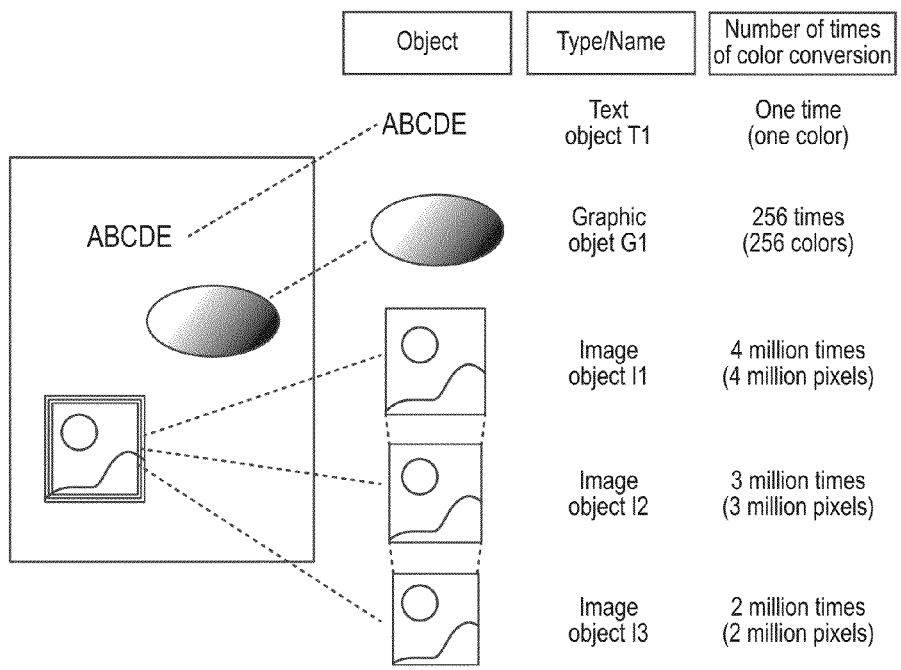
FIG. 8 is a diagram illustrating a method of counting the number of color conversions for each object included in the PDL data.

FIG. 8 is a diagram illustrating a method of counting the number of color conversions for each object included in the PDL data.

In the example illustrated in FIG. 8, a text object T1 that reads "ABCDE", a graphic object G1 in the shape of an ellipse, and image objects I1 to I3 that have different sizes and layered with each other in a predetermined order are arranged in the page included in the PDL data.

The text object T1 is represented using only one color. Accordingly, the number of times of color conversion process to be performed is one (one time) regardless of the number and sizes of its characters. As a result, the number of times of color conversion of this text object is one time. When one text object has more than one color, then the number of times of color conversion will be the number of colors being used.

The graphic object G1 is represented by gradation expression formed by 256 gradations of different colors progressively changing from one gradation to another. Accordingly, the number of times of color conversion process to be performed is 256 times. As a result, the number of color conversions of this graphic object is 256 times.

The image object I1 is formed by four million (4,000,000) pixels. Thus, the number of times of color conversion process to be performed therefor is four million (4,000,000) times. The number of color conversions of the image object I1 is therefore four million (4,000,000) times. Likewise, the number of color conversions of the image object I2 is three million (3,000,000) times, and the number of color conversions of the image object I3 is two million (2,000,000) times.

As such, the total number of color conversions for the page illustrated in FIG. 8 is the sum of one time, 256 times, four million (4,000,000) times, three million (3,000,000) times, and two million (2,000,000) times, and thus will be nine million two hundred and fifty seven (9,000,257) times.

In this embodiment, the number of color conversions for the text object and the graphic object is negligibly small when compared with the number of color conversions for the image object. In view of this, the process of counting the number of color conversions illustrated by the flowchart of FIG. 7 only counts the number of color conversions of the image object so as to increase processing efficiency. However, it should be noted that the numbers of times of color conversion of the text object and the graphic object may also be counted and the sum of the number of color conversions within a page may calculated as the total number of color conversions of all of the objects.

(Counting Process of the Second Number of Color Conversions)

Figure 9:
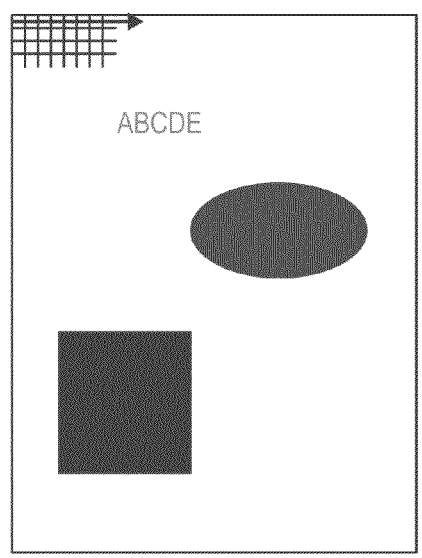
FIG. 9 is a diagram illustrating a method of counting a second number of color conversions.

FIG. 9 is a diagram illustrating a method of counting the second number of color conversions.

As illustrated in FIG. 9, the second number of color conversions is calculated by checking, one at a time in a predetermined order, the data of the tag bits associated with the attribute information of each pixel, and counting the number of data whose attribute information indicates "Image". In the following, the calculation method will be described in detail.

The second number of color conversions is, as described above, the number of the pixels that are included in the raster data, and that are to be subjected to the color conversion process. In this embodiment, the number of pixels to be subjected to the color conversion process is defined to be the number of pixels that are included in the raster data and form the image, i.e., the number of pixels whose attribute information in the tag bits indicates "Image". Accordingly, pixels whose attribute information indicated by the tag bits is either "Text", "Graphic", or "None" (no object) are not counted as being included in the pixels to be subjected to the color conversion process.

The reason why the number of pixels whose attribute information indicates "Image" is counted is that texts and graphics are typically represented by only one color or a relatively limited range or number of colors, and that the number of pixels of texts and graphics to be subjected to the color conversion process is negligibly small when compared with that of the pixels of images. For example, in a case of raster data generated on the basis of an object represented using only one color, the color of the text-forming region (s) will be all identical or equivalent. Accordingly, when the color of one pixel out of these text-forming pixels is subjected to the color conversion process, the resultant color after the color conversion process can be equally applied to the remaining pixels. In other words, the remaining pixels do not need to be subjected to the color conversion process. Thus, the number of times of color conversion process to be performed for the text-forming region(s) in the raster data will be one (one time). As a result, the number of color conversions for this text-forming region(s) is one (onetime).

Meanwhile, when it is raster data generated on the basis of an image object such as photographic data, it is necessary to perform, in the same or similar manner as in the case of the image object, the color conversion process on a per-pixel basis for the pixels constituting that image. As a result, the number of times of color conversion process to be performed for the region constituting the image in the raster data will be equal to the number of the pixels constituting that image. Thus, texts and graphics involve negligibly small number of pixels that are to be subjected to color conversion process when compared with images. Accordingly, in this embodiment, the second number of color conversions is calculated by counting the number of data whose attribute information in the tag bits indicates "image".

(Management Information of the Number of Color Conversions)

FIG. 10 is a diagram illustrating exemplary management information of the number of color conversions.

The printer controller 20 stores the information regarding the obtained numbers of color conversions of the print jobs in the job storage unit 105 on a per-print-job basis as the number of color conversions management information.

As illustrated in FIG. 10, the number of color conversions management information includes job name, resolution, and the number of color conversions.

The job name indicates the name assigned to the print job. For example, the job name is a file name of document data included in the print job or any other name defined by a user. The resolution is a specified value of the resolution that is specified for each print job. The resolution represents an output resolution of the raster data generated on the basis of the PDL data. The number of color conversions represents the first number of color conversions and the second number of color conversions for each page included in the print job. As discussed in the foregoing, the first number of color conversions and the second number of color conversions are calculated by the interpreter unit 101 and the color conversion pixel counting unit 104, respectively.

(Switching Process of the Color Conversion)

When this print job is to be printed again with color adjustment process or any other process performed therefor after the previous printing process according to the print job, the printer controller 20 decides whether the color conversion process is to be performed by the color conversion unit 102 or by the post color conversion unit 103, and thus switches the units that perform the color conversion process.

Figure 11:
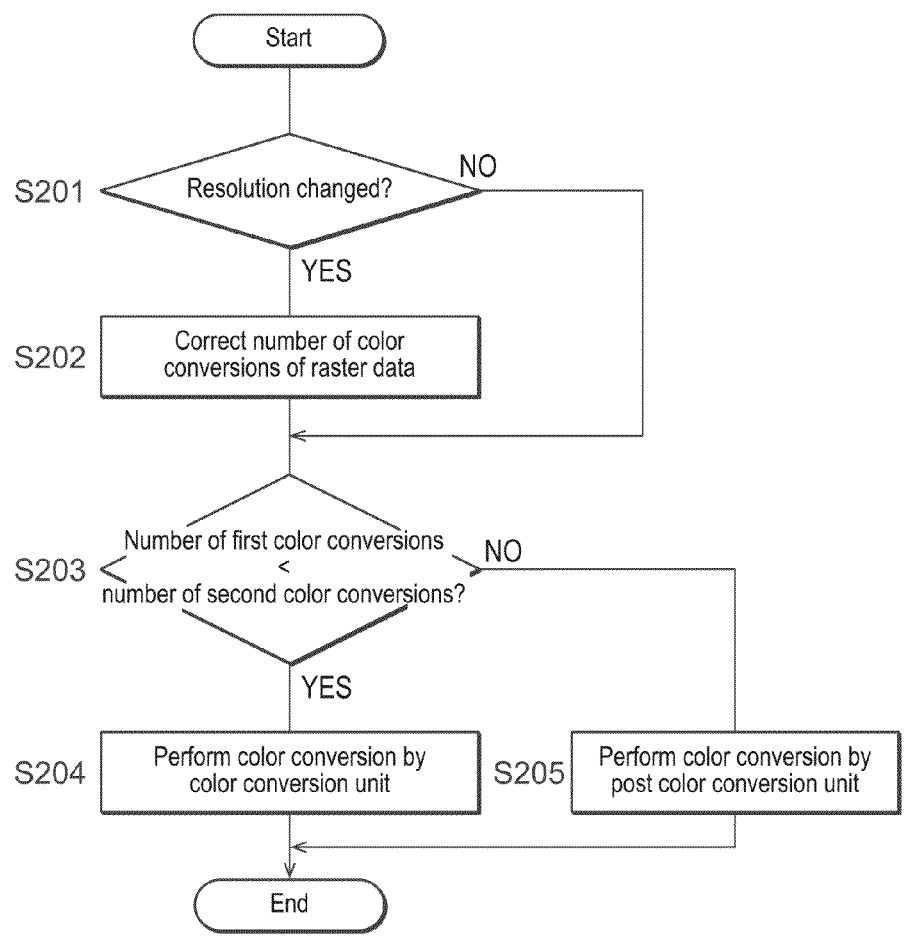
FIG. 11 is a flowchart illustrating a process flow of color conversion switching process.

FIG. 11 is a flowchart illustrating a procedure of color conversion switching process. FIG. 12 is a diagram illustrating a method of correction of the second number of color conversions in response to change in resolution.

As illustrated in FIG. 11, the printer controller 20 compares the resolution specified in the print job with the resolution included in the number of color conversions management information of this print job stored in the storage unit 105, and determines whether or not the resolution of the print job has been changed (Step S201).

When it is determined that the resolution of the print job has been changed (Yes in Step S201), the printer controller 20, in accordance with the change value of the resolution, correct the values of the second numbers of color conversions of each page recorded in the number of color conversions management information (Step S202). This is because the change in the resolution specified in the print job causes change in the number of the pixels constituting the page(s) of the raster data generated on the basis of the PDL data, and accordingly causes change in the second number of color conversions that is the number of pixels for which the color conversion process is required.

For example, as illustrated in FIG. 12, assume that the second number of color conversions is "25M" (25 million) in the page 1 in a print job having the resolution specified to "1200 dpi". When the resolution specified in the print job is changed to a half of "1200 dpi", i.e., "600 dpi", the number of the pixels constituting the page 1 of the raster data will be reduce to a quarter (¼) of it. The unit dpi (dots per inch) is a measure of dot density that indicates the number of pixels placed in a unit length. When the resolution value indicated in the unit of "dpi" is reduced to a half, then the number of pixels per unit area will be reduced to one half of one half (¼). When the resolution value in the dpi unit is doubled, the number of pixels per unit area will be quadrupled.

Accordingly, in the example of FIG. 12, since the number of the pixels constituting the page 1 of the raster data is reduced to a quarter (¼), the second number of color conversions that is the number of pixels for which the color conversion process is required will also be reduced to a quarter of "25M" (25 million), i.e., "6.25M" (6.25 million). In this manner, the printer controller 20 corrects the second numbers of color conversions for the pages on a per-page basis in accordance with the change value of the resolution.

Meanwhile, when it is determined that the resolution of the print job is not changed (No in Step S201), the printer controller 20 proceeds to the step S203.

Then, the printer controller 20 compares the first number of color conversions with the second number of color conversions on a per-page basis (Step S203), the first and second numbers of color conversions of each page being recorded in the number of color conversions management information.

When the first number of color conversions is smaller than the second number of color conversions (Yes in Step S203), the printer controller 20 normally makes the color conversion unit 102 perform the color conversion process for the PDL data (Step S204). The printer controller 20 makes the interpreter unit 101 perform the RIP processing, and transmits the generated raster data via the image transfer unit 106 to the printing engine 30.

When the second number of color conversions is smaller than the first number of color conversions (No in Step S203), the printer controller 20 does not make the color conversion unit 102 perform the color conversion process, but makes the interpreter unit 101 perform the RIP processing and thereby generate raster data. Then, the printer controller 20 makes the post color conversion unit 103 perform the color conversion process for the raster data (Step S205). The printer controller 20 transmits the raster data that has been subjected to the color conversion process via the image transfer unit 106 to the printing engine 30. When the first number of color conversions is equal to the second number of color conversions, either one of the steps S204 and S205 may be performed as appropriate.

After having performed the above-described processes for all pages included in the print job, the printer controller 20 terminates the series of processes.

For example, in the example illustrated in FIG. 12, when the resolution of the print job is "1200 dpi", the first number of color conversions is smaller the than the second number of color conversions. As a result, the number of times of the color conversion process will also become smaller when the color conversion unit 102 performs the color conversion process for the PDL data, and thus it is made possible to reduce the processing time. Meanwhile, when the resolution of the print job is "600 dpi", the second number of color conversions is smaller than the first number of color conversions. As a result, the number of times of the color conversion process will also become smaller when the post color conversion unit 103 performs the color conversion process for the raster data that has been subjected to the RIP processing, and thus it is made possible to reduce the processing time.

As described above, the print system according to this embodiment compares the first number of color conversions with the second number of color conversions, performs the color conversion process for the PDL data when the first number of color conversions is smaller than the second number of color conversions, and performs the color conversion process for the raster data when the second number of color conversions is smaller than the first number of color conversions. This makes it possible to minimize the number of times of the color conversion process. Accordingly, it is made possible to reduce the RIP processing time and achieve higher efficiency in the printing process.

In addition, the printer controller 20 calculates the number of the pixels that are included in the PDL data and form the image object as the first number of color conversions. This makes it possible to omit the calculation process of the number of color conversions for the text objects and the graphic objects having the smaller number of color conversions, and thereby achieve higher efficiency in the printing process.

Further, the printer controller 20 calculates the number of pixels whose attribute indicated by the tag bits is the image attribute in the raster data as the second number of color conversions. This makes it possible to omit the calculation processing of the number of color conversions for the pixels having the text attribute and the graphic attribute and having the smaller number of color conversions, and thereby achieve higher efficiency in the printing process.

In addition, when the output resolution of the reprinted raster data is different from the output resolution of the previous raster data, the printer controller 20 corrects the second number of color conversions. This makes it possible to appropriately calculate the second number of color conversions even when the output resolution is changed, and thereby achieve higher efficiency in the printing process.

Although the above-described embodiment assumes that only the number of color conversions of the image object is to be counted in the course of the calculation of the first number of color conversions, the invention is not limited to this specific embodiment. For example, in the calculation of the first number of color conversions, the numbers of color conversions of the text objects and the graphic objects may also be counted along with those of the image objects, so that the total number of color conversions of all of the objects may be calculated as the sum of the number of color conversions within one page. This makes it possible to more accurately calculate the number of times of the color conversion process for the PDL data, and thereby effectively reduce the processing time.

In addition, although the above-described embodiment assumes that, in the calculation of the second number of color conversions, only the number of the pixels whose attribute information indicated by the tag bits indicates "Image" is counted from among the pixels in the raster data, the invention is not limited to this specific configuration. For example, in the calculation of the second number of color conversions, pixels whose attribute information indicated by the tag bits is "Text" and/or "Graphic" may also be counted from among the pixels in the raster data. This makes it possible to more accurately calculate the number of times of the color conversion process for the raster data, and thereby effectively reduce the processing time.

Further, although the above-described embodiment assumes that the first number of color conversions and the second number of color conversions are compared with each other on a per-page basis, i.e., for each page included in the print job, the invention is not limited to this specific embodiment. It may also be contemplated that the first numbers of color conversions and the second numbers of color conversions of all of the pages are totaled, and the first number of color conversions and the second number of color conversions are compared with each other for the print job as a whole, and the color conversion processes may be switched in accordance with the result of comparison. This makes it possible to simplify the processes of the printer controller 20 and facilitate progress status management for each page.

In addition, although the above-described embodiment assumes that the printer controller 20 is provided inside the printing apparatus 2, the invention is not limited to this specific embodiment. The functions and processes of the printer controller 20 may be implemented by any separate devices provided separately from the printing apparatus 2.

The information processing apparatus and the information processing method according to the invention may be implemented by a dedicated hardware circuit configured for implementing the above-described processes or by a program describing the above-described processes and executed by the CPU. When the invention is implemented through such a program, the program for operating the information processing apparatus may be provided by a computer-readable recording medium such as a floppy disk and a CD-ROM, or provided on-line via a network such as the Internet. In that case, the program stored in the computer-readable recording medium will be typically transferred to a ROM unit or a hard disk to be stored therein. In addition, the program may be provided in the form of an independent application software program, or incorporated in a software program as one function thereof in the information processing apparatus.

What is claimed is:
1. An information processing apparatus comprising:
 a first calculation unit configured to calculate a number of times of color conversion performed for an object included in an original document data as a first number of color conversions when raster data is to be generated from the original document data included in a print job with color conversion being performed;

a tag bit generation unit configured to generate tag bits including attribute information for each of pixels of the raster data;

a second calculation unit configured to calculate a number of pixels that are included in the raster data and an attribute of the pixels indicated by the tag bits being an object attribute as a second number of color conversions; and a color conversion switching unit configured to, when new raster data is to be generated with color adjustment performed for the original document data, compare the first number of color conversions with the second number of color conversions, perform color conversion process for the original document data and then generate the new raster data when the first number of color conversions is smaller than the second number of color conversions, and generate the new raster data from the original document data and then perform color conversion process for the generated new raster data when the second number of color conversions is smaller than the first number of color conversions.

2. The information processing apparatus as claimed in claim 1, wherein the first calculation unit calculates, as the first number of color conversions, a number of pixels constituting an image object included in the original document data.

3. The information processing apparatus as claimed in claim 1, wherein the second calculation unit calculates, as the second number of color conversions, a number of pixels that are included in the raster data and an attribute of the pixels indicated by the tag bits being an image attribute.

4. The information processing apparatus as claimed in claim 1, wherein the second calculation unit corrects the second number of color conversions when an output resolution of the new raster data is different from an output resolution of the raster data.

5. An information processing method comprising the steps of:
   (a) calculating a number of times of color conversion performed for an object included in an original document data as a first number of color conversions when raster data is to be generated from the original document data included in a print job with color conversion being performed;
   (b) generating tag bits including attribute information for each of pixels of the raster data;
   (c) calculating a number of pixels that are included in the raster data and an attribute of the pixels indicated by the tag bits being an object attribute as a second number of color conversions; and
   (d) when new raster data is to be generated with color adjustment performed for the original document data, comparing the first number of color conversions with the second number of color conversions, performing color conversion process for the original document data and then generating the new raster data when the first number of color conversions is smaller than the second number of color conversions, and generating the new raster data from the original document data and then performing color conversion process for the generated new raster data when the second number of color conversions is smaller than the first number of color conversions.

6. A non-transitory computer-readable recording medium stored with an information processing program for causing a computer to execute the steps of:
   (a) calculating a number of times of color conversion performed for an object included in an original document data as a first number of color conversions when raster data is to be generated from the original document data included in a print job with color conversion being performed;
   (b) generating tag bits including attribute information for each of pixels of the raster data;
   (c) calculating a number of pixels that are included in the raster data and an attribute of the pixels indicated by the tag bits being an object attribute as a second number of color conversions; and
   (d) when new raster data is to be generated with color adjustment performed for the original document data, comparing the first number of color conversions with the second number of color conversions, performing color conversion process for the original document data and then generating the new raster data when the first number of color conversions is smaller than the second number of color conversions, and generating the new raster data from the original document data and then performing color conversion process for the generated new raster data when the second number of color conversions is smaller than the first number of color conversions.

\* \* \* \* \*